(12) United States Patent
Yilmaz Kanargi et al.

(10) Patent No.: US 12,070,734 B2
(45) Date of Patent: Aug. 27, 2024

(54) AEROGEL FOR HARVESTING ATMOSPHERIC WATER

(71) Applicant: National University of Singapore, Singapore (SG)

(72) Inventors: Gamze Yilmaz Kanargi, Singapore (SG); Ghim Wei Ho, Singapore (SG)

(73) Assignee: NATIONAL UNIVERSITY OF SINGAPORE, Singapore (SG)

(*) Notice: Subject to any disclaimer, the term of this patent is extended or adjusted under 35 U.S.C. 154(b) by 98 days.

(21) Appl. No.: 17/687,218

(22) Filed: Mar. 4, 2022

(65) Prior Publication Data
US 2022/0280915 A1    Sep. 8, 2022

(30) Foreign Application Priority Data
Mar. 5, 2021    (SG) .......................... 10202102288X (51) Int. Cl.
| | | |
|---|---|---|
| B01J 20/22 | (2006.01) | |
| B01J 13/00 | (2006.01) | |
| B01J 20/28 | (2006.01) | |
| C08F 220/54 | (2006.01) | |
| C08J 3/24 | (2006.01) | |
| C08J 9/36 | (2006.01) | |

(52) U.S. Cl.
CPC ......... B01J 20/226 (2013.01); B01J 13/0091 (2013.01); B01J 20/28011 (2013.01); B01J 20/28047 (2013.01); C08F 220/54 (2013.01); C08J 3/24 (2013.01); C08J 9/36 (2013.01); B01J 2220/50 (2013.01)

(58) Field of Classification Search
None
See application file for complete search history.

(56) References Cited

U.S. PATENT DOCUMENTS

2020/0206710 A1* 7/2020 Yeung .................... C07F 3/003

* cited by examiner

*Primary Examiner* — Daniel Berns
(74) *Attorney, Agent, or Firm* — Harness, Dickey & Pierce, P.L.C.

(57) ABSTRACT

An aerogel for harvesting atmospheric water is provided. More specifically, there is provided a polymer-metal organic framework mixed-matrix aerogel comprising a polymer cross-linked with a metal organic framework, wherein the aerogel is capable of continuous sorption-desorption of atmospheric water. There is also provided a method of forming the aerogel.

19 Claims, 10 Drawing Sheets

AEROGEL FOR HARVESTING ATMOSPHERIC WATER

CROSS-REFERENCE TO RELATED APPLICATIONS

This application claims the benefit and priority of Singapore Application No. 10202102288X, filed Mar. 5, 2021. The entire disclosure of the above application is incorporated herein by reference.

TECHNICAL FIELD

The present invention relates to an aerogel for harvesting atmospheric water.

BACKGROUND

Atmospheric water is a sustainable source for freshwater supply that replenishes continuously via the global hydrological cycle. Typical air-to-water capture technologies, such as fog and dew water collectors, enable decentralized water collection and onsite production. However, at present all the known water collectors require energy and are constrained by climate conditions.

Desiccant-based atmospheric water extraction has also been explored in which liquid or solid desiccants are used for capturing water from humid air in the atmosphere during the night and desorbing water during the day. While such set ups use photothermic materials and sunlight to passively collect atmospheric water, the overall water collection rate is still bounded by the sluggish kinetics of sorption-desorption, the availability of sunlight only during the day, the need for iterative sorption-desorption steps, and the need to open and close the water collection chamber during sorption-desorption cycles.

There is therefore a need for an improved method of harvesting atmospheric water.

SUMMARY OF THE INVENTION

The present invention seeks to address these problems, and/or to provide an improved material for harvesting atmospheric water.

According to a first aspect, the present invention provides a polymer-metal organic framework mixed-matrix aerogel comprising a polymer cross-linked with a metal organic framework, wherein the aerogel is capable of continuous sorption-desorption of atmospheric water. In particular, the aerogel may enable continuous sorption-desorption of atmospheric water without use of external energy sources. According to a particular aspect, the aerogel enables collection of ≤6.4 g/g water per day at 90% relative humidity.

The polymer may be any suitable polymer. For example, the polymer may comprise, but is not limited to, polyacrylamide (PAM), polypyrrole (PPy), polyvinyl alcohol (PVA), polyacrylic acid (PAA), polyether, polyoxazole, poly(N-vinylcaprolactam) (PVCL), polysilicone, agarose, cellulose, chitosan, co-polymers or mixtures thereof. In particular, the polymer may be poly(N-isopropylacrylamide) (PNIPAM).

The metal organic framework may comprise a suitable metal. For example, the metal organic framework may comprise, but is not limited to: chromium, zirconium, iron, aluminium, titanium, hafnium, gallium, yttrium, vanadium, zinc, cobalt, copper, magnesium, nickel, alloys or mixtures thereof. In particular, the metal comprised in the metal organic framework may be chromium. Even more in particular, the metal organic framework may comprise MIL-101(Cr).

The aerogel may comprise ≤40 wt % metal organic framework based on the total weight of the aerogel.

The metal organic framework may be doped. For example, the metal comprised in the metal organic framework may be doped with another metal. The doped metal may be any suitable metal. In particular, the doped metal may have photothermal properties. According to a particular aspect, the doped metal may comprise, but is not limited to: silver, gold, platinum, copper, aluminium, nickel, cobalt, molybdenum, alloys or mixtures thereof.

The polymer cross-linked with the metal organic framework may be in a suitable form. For example, the polymer cross-linked with the metal organic framework may be in a coil state.

The polymer cross-linked with a metal organic framework may further comprise a hygroscopic salt. The hygroscopic salt may be any suitable salt. For example, the hygroscopic salt may be, but not limited to: $CaCl_2$, $LiCl$, $MgCl_2$, $LiBr$, $ZnCl_2$, $FeCl_3$, $Zn(NO_3)_2$, $Cu(NO_3)_2$, $Ni(NO_3)_2$, $Mn(NO_3)_2$, or mixtures thereof.

The aerogel may be a self-standing aerogel.

According to a second aspect, the present invention provides a method of preparing a polymer-metal organic framework mixed-matrix aerogel according to the first aspect, the method comprising:
  polymerising a polymer and a metal organic framework in the presence of a crosslinker and initiator to obtain a polymer-metal organic framework hydrogel;
  transforming polymer chains comprised in the polymer-metal organic framework hydrogel from globule state to coil state; and
  freeze-drying the hydrogel to form the aerogel.

The polymerising may be carried out under suitable conditions. According to a particular aspect, the polymerising may be carried out for ≥0.5 hours.

According to another particular aspect, the polymerising may be carried out at a temperature of 4-60° C.

The transforming may comprise introducing hydro-active sorption sites in the hydrogel. In particular, the introducing may comprise adding a hygroscopic salt solution to the hydrogel. For example, the introducing may comprise ionically grafting the hydro-active sorption sites.

BRIEF DESCRIPTION OF THE DRAWINGS

In order that the invention may be fully understood and readily put into practical effect there shall now be described by way of non-limitative example only exemplary embodiments, the description being with reference to the accompanying illustrative drawings. In the drawings:

FIG. 4 shows characterization of PC-MOF in which

DETAILED DESCRIPTION

As explained above, there is a need for an improved material which is able to harvest atmospheric water which is not energy intensive Generally, the present invention provides an aerogel material which is able to harvest atmospheric water spontaneously and efficiently using minimum external energy, and without requiring ancillary equipment such as evaporators and condensers. In particular, the tunable hydrophilic chain of the polymer-based aerogel allows enhanced water uptake and reversible hydrophilic-hydrophobic transitions. This enables autonomous water release and stand-alone airborne water supply without requiring any moving parts.

According to a first aspect, the present invention provides a polymer-metal organic framework mixed-matrix aerogel comprising a polymer cross-linked with a metal organic framework, wherein the aerogel is capable of continuous sorption-desorption of atmospheric water.

The polymer comprised in the aerogel may be any suitable polymer. According to a particular aspect, the polymer may be a polymer which exhibits reversible phase or volume change transition in response to a change in stimuli such as temperature, pH, ion concentration, electric field, magnetic field, light or a combination thereof. In particular, the polymer may be a non-swelling cross-linked polymer. The polymer comprised in the aerogel may enable restricted volumetric transition and steric pressure.

The polymer may be, but not limited to: polyacrylamide (PAM), polypyrrole (PPy), polyvinyl alcohol (PVA), polyacrylic acid (PAA), polyether, polyoxazole, poly(N-vinylcaprolactam) (PVCL), polysilicone, agarose, cellulose, chitosan, co-polymers or mixtures thereof. For example, the polymer may comprise, but is not limited to: poly(N-isopropylacrylamide) (PNIPAM), polyethylene oxide (PEO), poly(2-carboxylisopropylacrylamide) (PCIPAAm), poly(2-aminoisopropylacrylamide) (PAIPAAm), poly(2-hydroxyisopropylacrylamide) (PHIPAAm), poly(N,N-diethylacrylamide) (PDEAAm), poly(methyl vinyl ether) (PMVE), polyethylene glycol (PEG), poly-(dimethylsiloxane) (PDMS), derivatives of 2-oxazoline (POx) such as poly(2-cyclopropyl-2-oxazoline) (PcPOx), poly(2-n-propyl-2-oxazoline) (PnPOx), poly(2-isopropyl-2-oxazoline) (PiPOx), poly(2-methyl-2-oxazoline) (PMOx), derivatives of poly(2-oxazine)s (POZIs) such as poly(2-ethyl-2-oxazine) (PEOZI), poly(2-n-propyl-2-oxazine) (PnPropOZI), derivatives of agarose, cellulose and chitosan such as methyl cellulose (MC), hydroxypropyl cellulose (HPC), hydroxypropylmethyl cellulose (HPMC), ethylhydroxyethyl cellulose (EHEC) and hydroxyethyl cellulose (HEC)), copolymers, homopolymers, or mixtures thereof. In particular, the polymer may be PNIPAM.

The metal organic framework comprised in the aerogel may comprise any suitable metal. According to a particular aspect, the metal may be, but not limited to: chromium, zirconium, iron, aluminium, titanium, hafnium, gallium, yttrium, vanadium, zinc, cobalt, copper, magnesium, nickel, alloys or mixtures thereof. For example, the metal organic framework may comprise, but is not limited to: MIL-101 (Cr), (M)MIL-53 (where M: Cr, Al, Fe, Ga), MIL-100, MIL-160, HKUST-1, (M)MOF-74 (where M: Mg, Co, Zn), UiO-66, UiO-67, MOF-801, MOF-808, MOF-841, DUT-51, DUT-67, ZIF-8, ZIF-67, ZIF-90, ZIF-71, CAU-1, CAU-10, PIZOF-2, MCM-41, Zeolite 13X, BASF A-520, Y-shp-MOF-5. In particular, the metal comprised in the metal organic framework may be chromium. Even more in particular, the metal organic framework may comprise MIL-101(Cr).

The metal organic framework may be in any suitable form. For example, the metal organic framework may be in the form of nanoparticles. The average size of the metal organic framework may be 1 nm-30 μm. The average size may refer to the average dimension of any one side of the metal organic framework. In particular, the average size of the metal organic framework may be 5 nm-20 μm, 10 nm-10 μm, 50-1000 nm, 100-750 nm, 250-500 nm.

The polymer cross-linked with a metal organic framework may comprise a suitable amount of metal organic framework. According to a particular aspect, the polymer cross-linked with the metal organic framework may comprise ≤40 wt % metal organic framework based on the total weight of the aerogel. In particular, the polymer cross-linked with the metal organic framework may comprise 5-40 wt %, 10-30 wt %, 15-25 wt %, 18-20 wt % metal organic framework based on the total weight of the aerogel. Even more in particular, the polymer cross-linked with the metal organic framework may comprise 5-20 wt %.

The metal organic framework may comprise good water stability, as well as good sorption kinetics. The metal organic framework in the polymer-metal organic framework mixed-matrix aerogel provides good water sorption for the aerogel in combination with the dynamic conformational water repelling feature of the polymer.

The metal organic framework may optionally be doped. For example, the metal comprised in the metal organic framework may be doped with any suitable dopant. The dopant may be a plasmonic and/or photothermal material. In particular, the dopant may be a metal, carbon-based material or semiconducting material. The carbon-based material may be carbon nanotubes, graphene, carbon black or a mixture thereof. The semiconducting material may be $TiO_x$, $Cu_2$-$xSe$, $Cu_2$-$xS$, or a mixture thereof. The dopant may be a metal, such as a transition metal or post-transition metal. According to a particular aspect, the dopant may comprise, but is not limited to silver, gold, platinum, copper, aluminium, nickel, cobalt, molybdenum, alloys or mixtures thereof. In particular, the dopant may be silver.

According to a particular aspect, the metal organic framework may be doped with a photothermal metal. In particular, the aerogel comprising the metal organic framework doped with a photothermal metal may suppress light reflectance compared to an aerogel comprising a metal organic framework without a photothermal metal, thereby improving the light-to-heat conversion capability of the aerogel.

The polymer cross-linked with the metal organic framework may be in a suitable form. For example, the polymer cross-linked with the metal organic framework may be in a coil state. In the coil state, the functionality of the polymer chains may be changed to enable intermolecular interaction. For example, the polymer chains may be modified to incorporate hydro-active sorption sites with high water affinity. In particular, the polymer chains may be modified to ionically graft the hydro-active sorption sites to the polymer chains. Even more in particular, the hydro-active sorption sites may be incorporated by providing a hygroscopic salt. The hydro-active sorption sites on the polymer chains results in excellent atmospheric water update and direct release properties for the aerogel.

Accordingly, the polymer cross-linked with a metal organic framework may further comprise a hygroscopic salt. The hygroscopic salt may be any suitable salt. The hygroscopic salt may comprise chlorides, bromides, nitrates, or mixtures thereof. For example, the hygroscopic salt may be, but not limited to: $CaCl_2$, $LiCl$, $MgCl_2$, $LiBr$, $ZnCl_2$, $FeCl_3$, $Zn(NO_3)_2$, $Cu(NO_3)_2$, $Ni(NO_3)_2$, $Mn(NO_3)_2$, or mixtures thereof. In particular, the hygroscopic salt may be $CaCl_2$.

Figure 2:
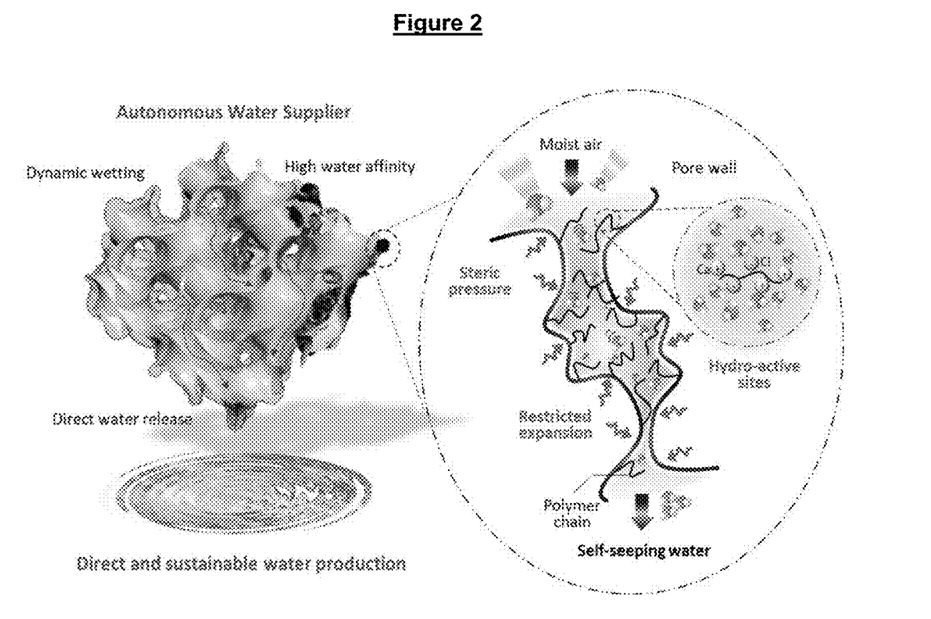
FIG. 2 shows a schematic representation of the atmospheric water capture and delivery process of the aerogel according to one embodiment of the present invention.

A schematic representation of the aerogel is as shown in FIG. 2. In particular, the aerogel enables and maintains continuous sorption-desorption through the direct release of weakly bound water clusters to support the uninterrupted regeneration of hydro-active sites and to further the sorption process.

In particular, the aerogel may enable continuous sorption-desorption of atmospheric water without use of external energy sources. This allows the aerogel to be used in a standalone water harvesting system which may be cost-effective and green.

The aerogel may have a rigid, micro/meso-porous and hydrophilic structure. The aerogel enables harvesting of atmospheric water via two simultaneous processes—direct water release, and water retention. The synchronous atmospheric water capture may comprise in-situ condensation in micropores and direct water release through the mesopores of the aerogel. When the aerogel is exposed to a humid atmosphere, for example at relative humidity of $\geq 60\%$, water vapour may be adsorbed on the pore surface and this saturates, condenses and exudes as gravitational force and surface energy overcome the coalescence of water. The wet aerogel releases the water while confining a small amount of strongly coordinated water molecules within the pores. At lower relative humidity, the water retention within the aerogel may increase. According to a particular aspect, the aerogel enables collection of $\leq 6.4$ g/g water per day at 90% relative humidity.

The aerogel may be optionally desorbed. For example, in addition to the passively collected water obtained through the direct release process, the detailed water in the gel can also be optionally desorbed. Confined water molecules in the polymeric chain may detach from the aerogel, nucleate in liquid form, and flow, migrate and coalesce into larger clusters, to form a liquid layer on the surface. This may be at a suitable temperature. For example, the temperature may be $\geq 25°$ C. In particular, at the lower critical solution temperature (LCST) of the polymer comprised in the aerogel, a hydrophobic surface may be formed that facilitates the expulsion process of the weakly bound water molecules at the solid/liquid interface compared to the more strongly bound water molecules in the hydrophilic structure.

The aerogel may be a self-standing aerogel. This means that the aerogel may be mechanically stable and strong enough to be free-standing without requiring any substrate.

The aerogel may have any suitable shape. For example, the aerogel may be in the shape of, but not limited to, a cone or circular disc. According to a particular aspect, the aerogel may be in the form of a cone. In this way, the directional migration of water droplets for accelerated removal may be achieved by gravity effect in order o enable rapid movement and coalescence of seeped droplets and to ease the release of accumulated ones at the tip of the cone.

According to a second aspect, the present invention provides a method of preparing a polymer-metal organic framework mixed-matrix aerogel according to the first aspect, the method comprising:

polymerising a polymer and a metal organic framework in the presence of a crosslinker and initiator to obtain a polymer-metal organic framework hydrogel;

transforming polymer chains comprised in the polymer-metal organic framework hydrogel from globule state to coil state; and drying the hydrogel to form the aerogel.

The polymer and the metal organic framework may be as described above.

The cross-linker may be any suitable cross-linker. For example, the cross-linker may be selected based on the polymer comprised in the aerogel to be formed. In particular, the cross-linker may be, but not limited to, N,N'-methylenebisacrylamide (mBAm), phytic acid, or a mixture thereof.

The initiator may be any suitable initiator. For example, the initiator may be selected based on the polymer and cross-linker used for the polymerising. In particular, the initiator may be, but not limited to, ammonium persulfate, 2,2'-azobisisobutyronitrile (AIBN), azobis(4-cyanovaleric acid), potassium persulfate, riboflavin, or mixtures thereof.

The polymerising may further comprise adding a catalyst. The catalyst may be any suitable catalyst suitable for polymerisation reactions. For example, the catalyst may be, but not limited to, N,N,N',N'-tetramethylethylenediamine (TEMED), ascorbic acid, ethylenediamine tetraacetic acid, or mixtures thereof.

The polymerisation may comprise in situ free-radical polymerisation and crosslinking. Following the polymerisation, the metal organic framework may be connected to the polymer matrix via good adhesion without any interfacial voids. This may be due to the functionality of the polymer matrix and the metal organic framework.

The polymerising may be carried out under suitable conditions. According to a particular aspect, the polymerising may be carried out for $\geq 0.5$ hours. In particular, the polymerising may be carried out for 0.5-168 hours, 1-144 hours, 3-132 hours, 6-120 hours, 12-100 hours, 18-96 hours, 24-84 hours, 36-72 hours, 42-60 hours, 48-50 hours. Even more in particular, the polymerising may be carried out for about 12 hours.

According to another particular aspect, the polymerising may be carried out at a temperature of 4-60° C. In particular, the polymerising may be carried out at a temperature of 10-50° C., 15-45° C., 20-40° C., 25-30° C. Even more in particular, the polymerising may be carried out at about 4° C.

The method may further comprise forming the metal organic framework prior to the polymerising. The forming the metal organic framework may be by any suitable method known in the art. The forming may further comprise doping the metal organic framework with a dopant. The doping may be by any suitable method known in the art. The dopant may be any suitable dopant. For example, the dopant may be as described above in relation to the first aspect.

The transforming may comprise salinization of the hydrogel to transform the hydrogel from the globule state to the coil state. The transforming may further comprise introducing hydro-active sorption sites in the hydrogel. In particular, the introducing may comprise adding a hygroscopic salt solution to the hydrogel. The hygroscopic salt comprised in the hygroscopic salt solution may be any suitable hygroscopic salt. In particular, the hygroscopic salt may be as described above in relation to the first aspect. For example, the introducing may comprise ionically grafting the hydro-active sorption sites. Even more in particular, the introducing may comprise immersing the hydrogel in the hygroscopic salt solution for a suitable period of time.

The suitable period of time may be for 0.5-36 hours. For example, the period of time may be 1-30 hours, 2-25 hours, 5-20 hours, 10-18 hours, 12-16 hours, 14-15 hours. Even more in particular, the introducing may be for about 12 hours.

The introducing may be at a suitable temperature. For example, the introducing may be at 4-32° C., 5-30° C., 7-28° C., 10-25° C., 12-20° C., 15-18° C. Even more in particular, the introducing may be at a temperature of about 5° C.

The drying may be by any suitable method. For example, the drying may comprise freeze-drying the hydrogel to form the aerogel. The drying may be under suitable conditions such as in vacuum. The drying may be for a suitable period of time. For example, the drying may be for ≤48 hours. In particular, the drying may be for 2-48 hours, 5-47 hours, 10-46 hours, 12-45 hours, 15-42 hours, 18-40 hours, 20-36 hours, 24-32 hours, 28-30 hours. Even more in particular, the drying may be for 10-15 hours.

The drying may be at a suitable temperature. In particular, the drying may be freeze-drying and at a temperature of ≤−50° C.

Having now generally described the invention, the same will be more readily understood through reference to the following example which is provided by way of illustration, and is not intended to be limiting.

Example

Materials and Methods

Preparation of poly(N-isopropylacrylamide) (PNIPAM) Aerogel

Figure 1:
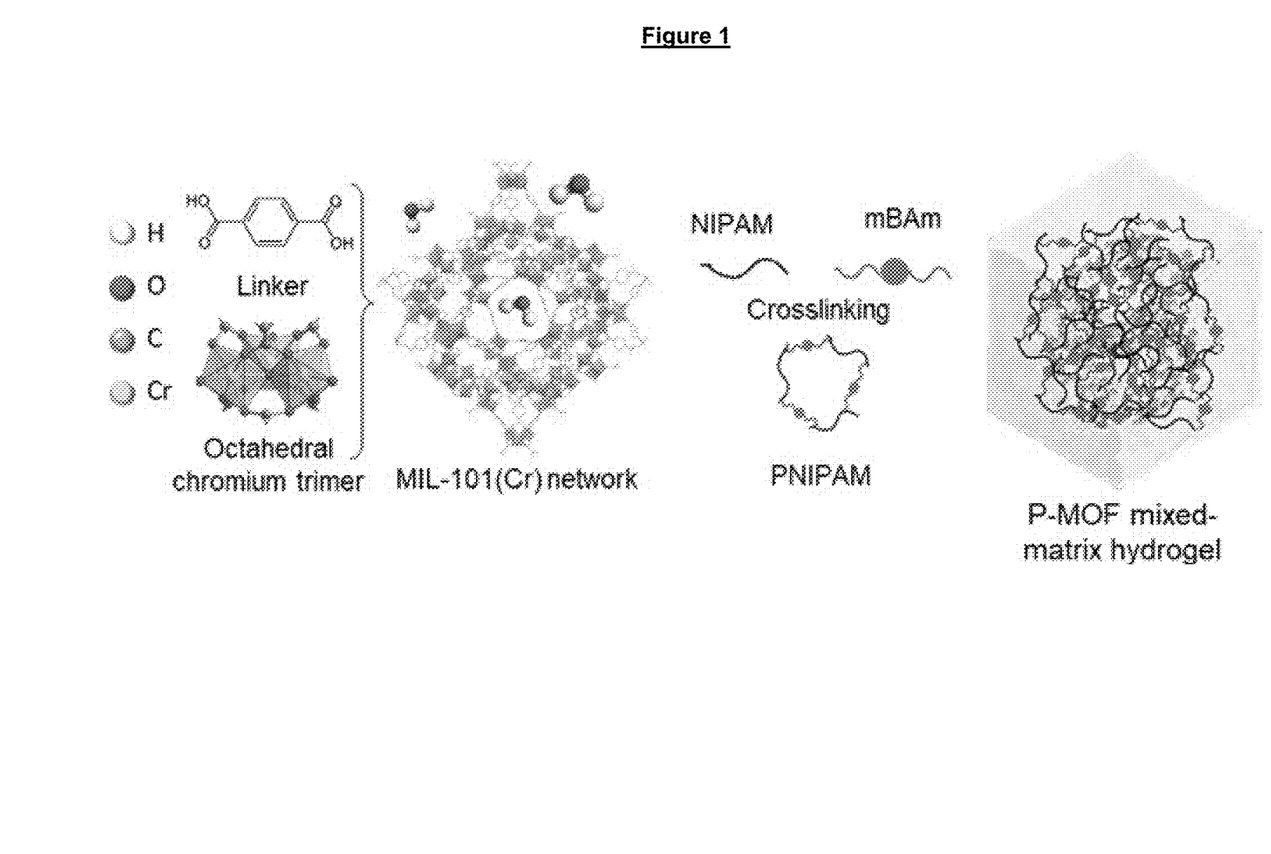
FIG. 1 shows building units and crystal structure of the metal organic framework, schematic crosslinking of the monomer (NIPAM) by cross-linker, and schematic preparation of the polymer-metal organic framework mixed-matrix hydrogel.

N-isopropylacrylamide (NIPAM) monomer (0.75 g) and N,N'-methylenebisacrylamide (mBAm) crosslinker (38 mg) were dissolved in deinozed (DI) water (7.5 mL), and purged with $N_2$ gas for 15 minutes by keeping the solution in an ice bath. Then, ammonium persulfate (23 mg, as the initiator) and tetramethylethylenediamine (TEMED) (45 µL, as the catalyst) were added into the purged solution to start the polymerization. The polymer solution was poured into a petri dish with the size of 35×10 mm. The polymerization was allowed to proceed for 12 hours at 4° C. After the polymerization was complete, the PNIPAM hydrogel was washed with copious amount of DI water and freeze-dried to obtain the aerogel. FIG. 1 shows the schematic crosslinking of the NIPAM monomer by mBAm cross-linker.

Preparation of MOF

The metal organic framework (MOF) (also referred to as MIL-101(Cr) in this Example) was synthesized through an alkaline mediated route. Briefly, 5 mL of alkaline aqueous solution containing 400 mg $Cr(NO_3)_3 \cdot 9H_2O$, 166 mg $H_2BDC$ and 0.1 mL tetramethyl ammonium hydroxide was added into a 25 mL autoclave reactor and kept at 180° C. for 24 hours. After the reaction, the solution was cooled to room temperature and centrifuged to collect the green precipitate. For further activation and removal of linker impurities, the as-collected green precipitate was first dispersed in dimethylformamide (DMF) and kept for 2 hours at 120° C. under stirring. Then, it was successively dispersed in ethanol at 60° C. for 2 hours and water at 90° C. for 2 hours under stirring. The collected material was dried under vacuum at room temperature for further use.

Preparation of Polymer-Metal Organic Framework Aerogel 120 mg MIL-101(Cr) was dissolved in 7.5 mL DI water before adding 750 mg NIPAM and 38 mg (mBAm) to prepare 16 wt. % NIPAM/MIL-101(Cr) solution. The solution was then purged with $N_2$ gas for 15 minutes in an ice bath. 23 mg ammonium persulfate and 45 µL TEMED were added into the purged solution to start the polymerization. The polymer solution was poured into a petri dish with the size of 35×10 mm. The polymerization was carried out for 12 hours at 4° C. Then, the polymerized PNIPAM/MIL-101(Cr) (P-MOF) hydrogel was washed with copious amount of DI water and freeze-dried to obtain the P-MOF aerogel. FIG. 1 shows the building units and crystal structure of MIL-101(Cr), and schematic preparation of the P-MOF mixed-matrix hydrogel.

Ionic Grafting: Preparation of PC and PC-MOF Aerogels

PNIPAM or P-MOF hydrogel was first immersed into cold DI water (5° C.) for 15 minutes to obtain polymeric hydrogel in coil conformation (PC and PC-MOF, respectively) surrounded with water molecules. The hydrogel was then transferred into hot DI water (60° C.) and kept for another 15 minutes to transform the polymer coins into globule state and squeeze out the bound and surrounding water molecules. This process was repeated 3 times. Subsequently, the hydrogel in globular conformation was quickly immersed into aqueous solution of $CaCl_2$) (160 mg/mL) at 5° C. and kept for 12 hours for interaction of the ions with the polymeric chain. To remove the unreacted $CaCl_2$, the hydrogel was washed with copious amount of hot (60° C.) (kept in for 15 minutes) and cold DI (5° C.) (kept in for 15 minutes) water, successively for three times. Finally, PC and PC-MOF hydrogels were freeze-dried to obtain the PC or PC-MOF aerogels, respectively.

Synthesis of Au Nanoparticles

Au nanoparticles were prepared, briefly described as follows. Aqueous solution of 150 mL of $HAuCl_4$ ($2.5 \times 10^{-4}$ M) was heated to boiling under continuous stirring in an oil bath. After 5 minutes of boiling, aqueous solution of 4.5 mL of trisodium citrate (0.034 M) was added, and the resulting solution was kept in boiling state with continuous stirring. After 20 minutes, the reaction was stopped and cooled to room temperature. The as-cooled Au solution was then added dropwise into an aqueous solution of 20 ml of polyvinylpyrrolidone (PVP) (0.5 g, Mw=55,000) with stirring, and stirring was continued for another 24 hours. Au nanoparticles were then centrifuged and washed three times with water at 14,000 rpm for 30 minutes. Finally, the Au nanoparticles were dispersed in water.

Preparation of Au@MIL-101(Cr) Nanoparticles 120 mg MIL-101(Cr) was dispersed in 18 mL DI water and stirred at 45° C. for 1 hour. Then, aqueous solution of 2 mL of Au nanoparticles (0.005 M) were added dropwise, and the solution was stirred at 45° C. for another 8 hours. After the reaction, the solution was cooled to room temperature and centrifuged to collect the Au@MIL-101(Cr) nanoparticles. The collected material was dried under vacuum at room temperature for further use.

Preparation of PCA-MOF Aerogel

The preparation of the PCA-MOF aerogel is similar to the PC-MOF aerogel preparation except for the use of Au@MIL-101(Cr) instead of MIL-101(Cr).

Results and Analysis

As seen in FIG. 2, the PC-MOF design uses a non-swelling crosslinked polymer to enable restricted volumetric transition and steric pressure. The activation of this polymer via ionic grafting improves the moisture harvesting affinity, while the hybridization of this polymer with a MOF accelerates the moisture harvesting rate. These design principles enable water coalescence and transport within the MOF-polymer pores, resulting in autonomous water collection.

Characterization of the PC-MOF

MIL-101(Cr) is a MOF having remarkable water-stability (i.e., over months under air and weeks in boiling water), high equilibrium water uptake (i.e., >1.5 g g$^{-1}$ above 2.4 kPa ($p/p_0$=0.57) at 30° C.) and fast sorption kinetics, making it a promising candidate for atmospheric water harvesting. It has a zeotype structure with mesoporous cages (diameters of 29 and 34 Å) and microporous windows (diameters up to 16 Å) accessible to water molecules.

MIL-101(Cr) nanoparticles were incorporated as fillers into the PNIPAM matrix to combine the superior water sorption of MOF with the dynamic conformational water repelling feature of PNIPAM. A porous P-MOF mixed-matrix structure is realized through in-situ free-radical polymerization and crosslinking. MIL-101(Cr) nanoparticles showed good adhesion to the polymer matrix without obvious interfacial voids, which may be due to rich chemical functionality of the polymer matrix (isopropyl and amide groups) and the filler nanoparticles (organic ligand, coordinatively unsaturated sites).

Figure 3:
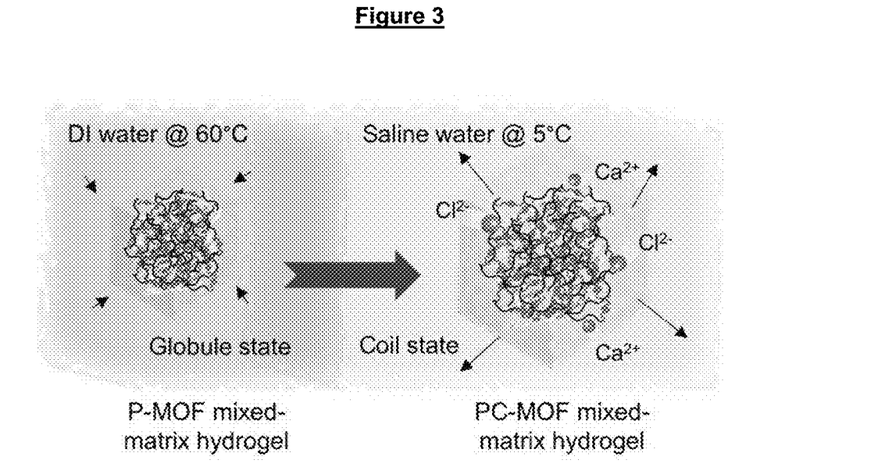
FIG. 3 shows a schematic representation of salinization process of the polymer-metal organic framework mixed-matrix hydrogel from globule state to coil state.

To further improve the water sorption properties of the P-MOF, hydro-active sorption sites with high water affinity were ionically grafted by levering the dynamic conformational change of PNIPAM chains at its lower critical solution temperature (LCST) (~32° C.) and interaction of the polymer with $CaCl_2$. P-MOF hydrogel-water interaction was minimized by collapsing the polymer chains into the globular state at 60° C., inducing a hydrophobic characteristic accompanied by intramolecular hydrogen bond formation (C=O ... H—N). The globule-to-coil state transformation was then initiated by immersing the collapsed P-MOF gel in cold saline solution (5° C.) to unlock the functional polymer chains to enable intermolecular interaction. This simultaneously activated the salinization of P-MOF to PC-MOF (FIG. 3).

Figure 4A:
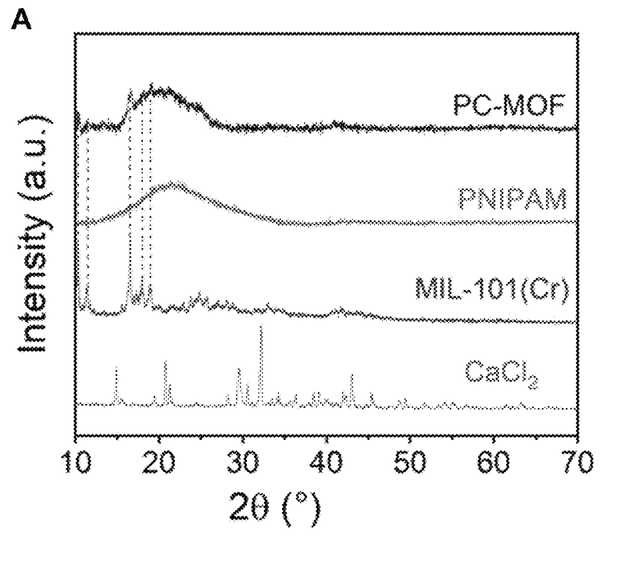
FIG. 4A shows XRD patterns of the MIL-101(Cr), PNIPAM, $CaCl_2$) and PC-MOF.
Figure 4B:
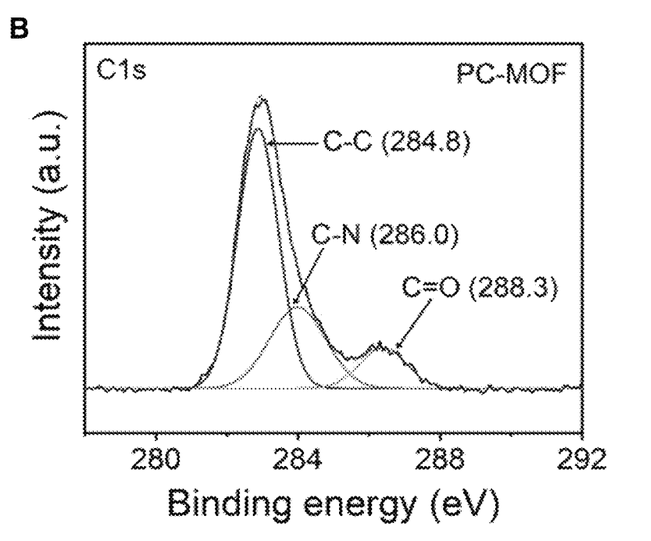
FIG. 4B shows high-resolution C1s XPS spectrum of the PC-MOF.
Figure 4C:
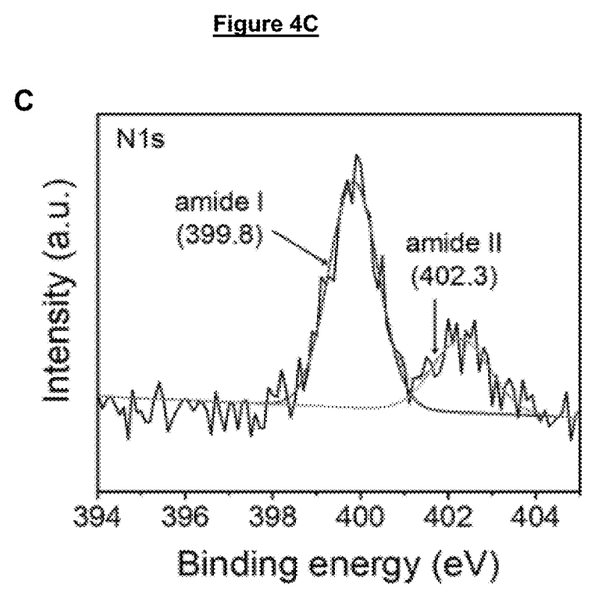
FIG. 4C shows high-resolution N1s XPS spectrum of the PC-MOF.

The X-ray diffraction (XRD) pattern of the PC-MOF (FIG. 4A) exhibited the peaks characteristic of MIL-101 (Cr), and a broad peak corresponding to amorphous PNIPAM. During the salinization process, the characteristic amide and carbonyl groups of thermo-responsive PNIPAM are preserved. X-ray photoelectron spectroscopy (XPS) of the PC-MOF for C1s (FIG. 4B) and N1s (FIG. 4C) core levels further prove the chemical structures.

Water Uptake and Direct Water Collection

Figure 5:
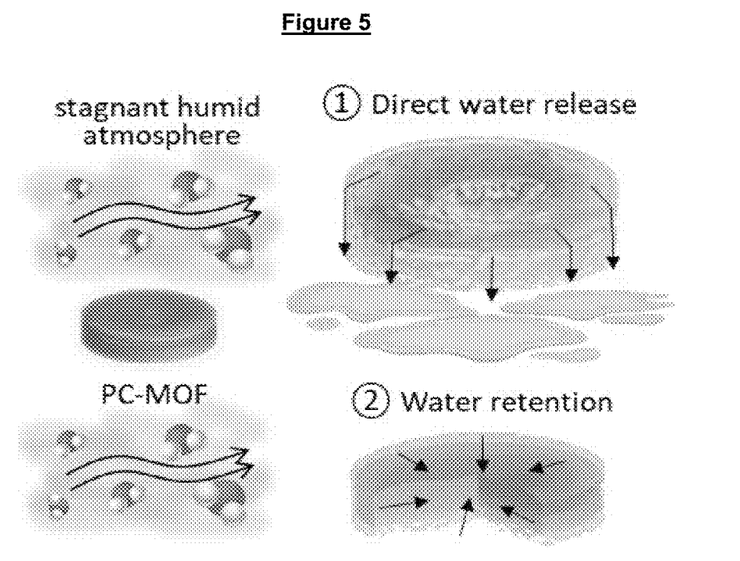
FIG. 5 shows a schematic illustration of the water harvesting processes; ① direct water release, and ② water retention.

Atmospheric water uptake and collection in the PC-MOF is realized through two simultaneous processes: (i) direct water release, and (ii) water retention (FIG. 5). When the PC-MOF is exposed to a humid atmosphere, water vapor adsorbed on the pore surface saturates, condenses, and exudes as the gravitational force and surface energy overcome the coalescence of water. The wet gel releases water while confining a small amount of the strongly coordinated water molecules within the pores.

Figure 6A:
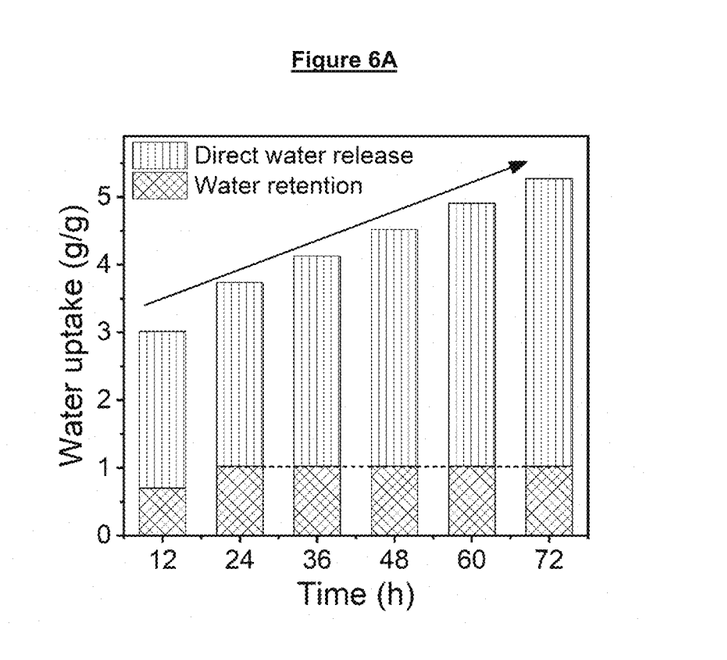
FIG. 6A shows continuous water uptake performance of the PC-MOF for 72 hours at 90% RH.
Figure 6B:
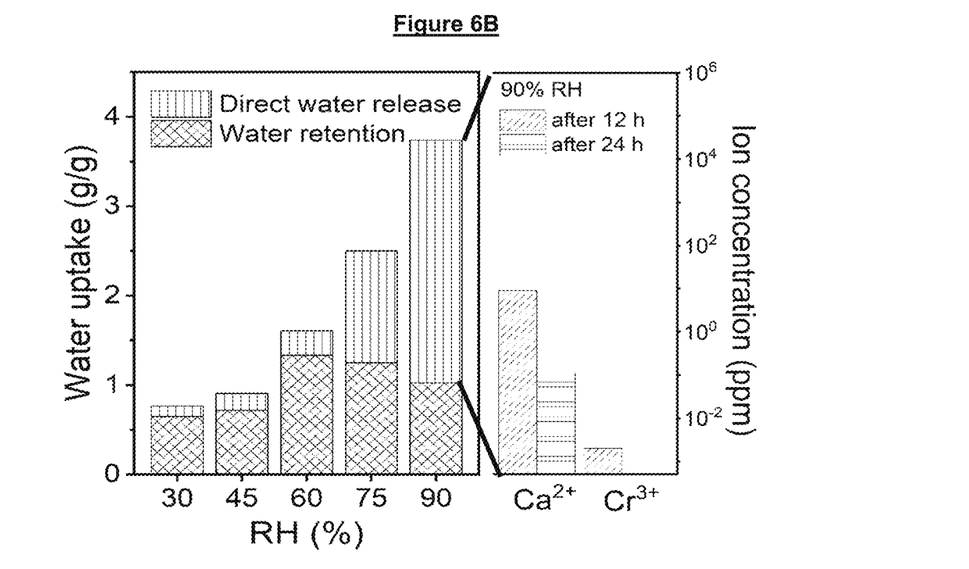
FIG. 6B shows water uptake mechanism and performance of the PC-MOF under various RH environments (left panel), and measured concentrations of $Ca^{2+}$ and $Cr^{3+}$ ions in the collected water after 12 and 24 hours of sorption and direct release process at 90% RH (right panel)

The PC-MOF harvested a total water amount of 3.01 g g$^{-1}$ after 12 hours of sorption at 90% relative humidity (RH), which consisted of 2.31 g g$^{-1}$ directly released water and 0.70 g g$^{-1}$ confined water (FIG. 6A). Over 72 hours of water harvesting at 90% RH, water retention was 1.02 g g$^{-1}$, and the passively collected water amount reached 4.25 g g$^{-1}$. This is more efficient compared with pristine MOFs and hygroscopic materials that require extra energy to evaporate, condense and collect the captured moisture described in prior art. Direct water release was the predominant process at environmental humidity values higher than 60% RH, while, at RH≤60%, water retention increased with increasing humidity, up to 1.3 g g$^{-1}$ at 60% RH (FIG. 6B, left panel).

In addition to the promising water uptake and direct release attributes of the sorbent, another essential factor is the quality of the collected water. The collected water must not be contaminated by the ionic and polymeric impurities released from the PC-MOF. Liquid water collected from the PC-MOF was analyzed by inductively coupled plasma mass spectrometry (ICP-MS) (FIG. 6B, right panel). $Ca^{2+}$ and $Cr^{3+}$ ion concentrations were below the level of drinking water standard defined by the World Health Organization.

Figure 7:
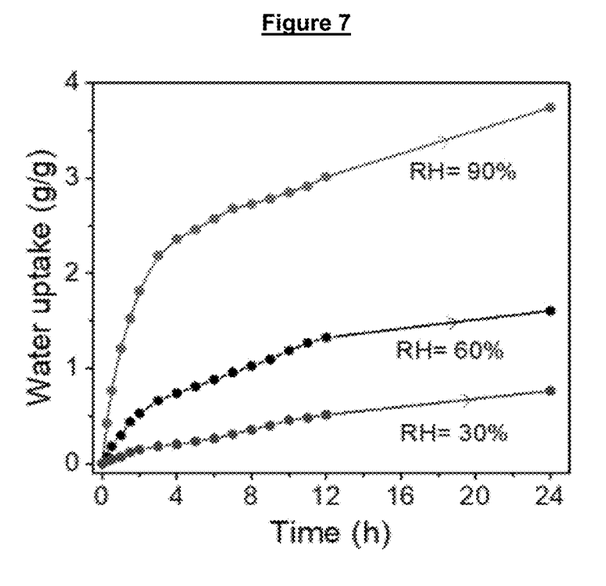
FIG. 7 shows water uptake rate of the PC-MOF at RHs of 30%, 60% and 90%.

Kinetic analysis was conducted to elucidate the water uptake dynamics of the PC-MOF at different RHs (FIG. 7). At 30% and 60% RH, water uptake gradually increased through sorption process under the effect of moisture adsorption and confinement. At 90% RH, fast uptake was realized within the first 3 hours with a sorption rate of 0.72 g g$^{-1}$ h$^{-1}$. The PC-MOF is capable of maintaining the uptake with a slower yet linear profile after 3 hours, due to the co-involvement of direct water release and the water retention processes.

Figure 8:
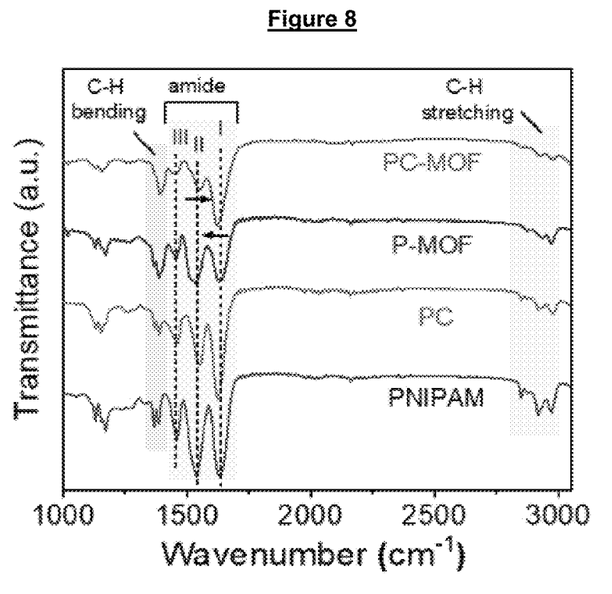
FIG. 8 shows FTIR spectra of the PNIPAM, PC, P-MOF and PC-MOF.

To investigate the changes in the microenvironment with salinization, Fourier transform infrared spectroscopy (FTIR) measurements were conducted. As seen in FIG. 8, FTIR spectra display characteristic C—H bending, C—H stretching and amide bands over the frequency range of 1000 to 3000 cm$^{-1}$. The amide I band (1635 cm$^{-1}$) shifted to a lower wavenumber upon interaction of the coiled polymer chain (PNIPAM and P-MOF) with the $CaCl_2$ below LCST (5° C.), which could be attributed to the binding of $Ca^{+2}$ to the amide carbonyl oxygen. On the other hand, anions (Cl$^-$) tend to bind to the amide II moiety, which is reflected by the shift in amide II band peak position observed in FIG. 8.

Figure 9:
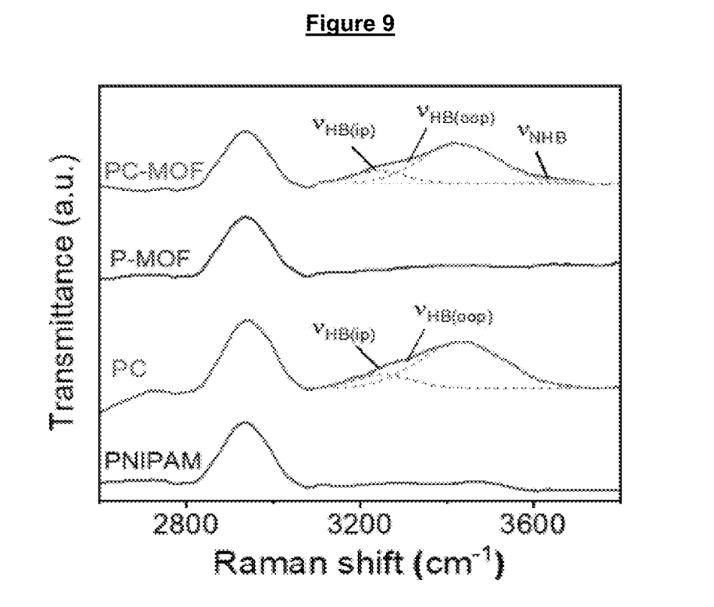
FIG. 9 shows Raman spectra of the PNIPAM, PC, P-MOF and PC-MOF after 1 hour adsorption at 90% RH, with all moisture sorption experiments conducted at 25° C.

The water structure on the sorption sites was confirmed by Raman spectroscopy (FIG. 9). The PC and PC-MOF exhibited an intense 0-H broad band around 3400 cm$^{-1}$ after 1 hour of sorption under 90% RH. The 0-H band of the PC is deconvolved into two components centered at 3255 and 3435 cm$^{-1}$, which are associated with the in-phase ($v_{HB(ip)}$) and out-of-phase ($v_{HB(oop)}$) 0-H stretching vibration modes of bound water in tetrahedral hydrogen. Compared with that of the PC, the PC-MOF spectrum shows curve fittings with $v_{HB(ip)}$, (3245 cm$^{-1}$) and $v_{HB(oop)}$, (3428 cm$^{-1}$) at lower vibrational energies, and a new 0-H mode appeared at 3642 cm$^{-1}$ that corresponded to free or weakly hydrogen bonded water molecules ($v_{NHB}$) in the form of partially and entirely broken water structure. This revealed that the PC-MOF is capable of capturing water in fully and weakly hydrogen-bonded states in a short sorption period, corroborating its high water-affinity, and capability of generating water network.

Thermal Activation of PC-MOF for Complete Water Desorption

Figure 10:
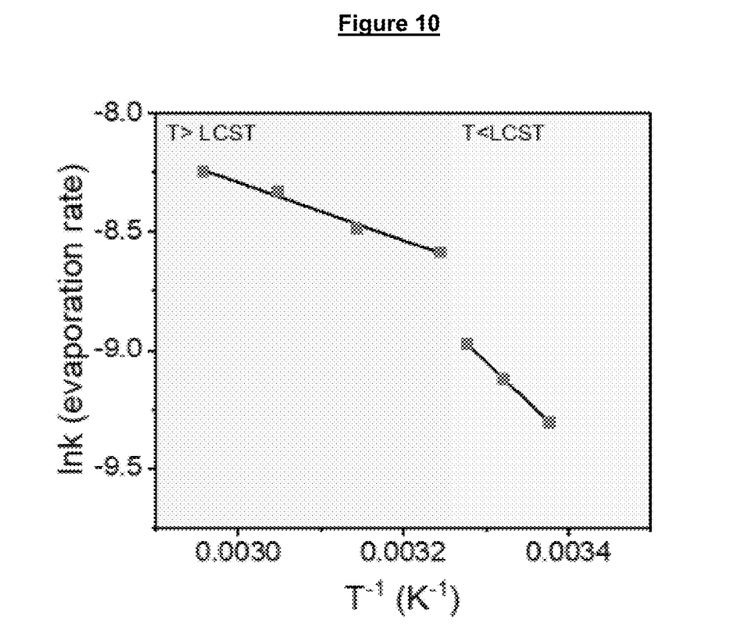
FIG. 10 shows an Arrhenius plot representing the evaporation rate of detained water in PC-MOF as a function of temperature.

In addition to the passively collected water obtained through the direct release process, the confined water in the gel can also be optionally desorbed. Confined water molecules in the polymeric chain can detach from the PC-MOF, nucleate in liquid form, and grow, migrate and coalesce into larger clusters, forming a liquid layer on the surface at temperature >25° C. The stimuli-response at LCST and water removal energy requirement were further verified using an Arrhenius plot (FIG. 10). The water evaporation profile of the PC-MOF exhibited two regions divided at the LCST over the temperature range 23-65° C., resulting in different activation energy values below (27.7 kJ mol$^{-1}$) and above (10.6 kJ mol$^{-1}$) the LCST. Lower activation energy above LCST is attributed to the formation of a hydrophobic surface that facilitates the expulsion process of the weakly-bound water molecules at the solid/liquid interface compared to the more strongly bound water molecules in the hydrophilic structure.

Figure 11:
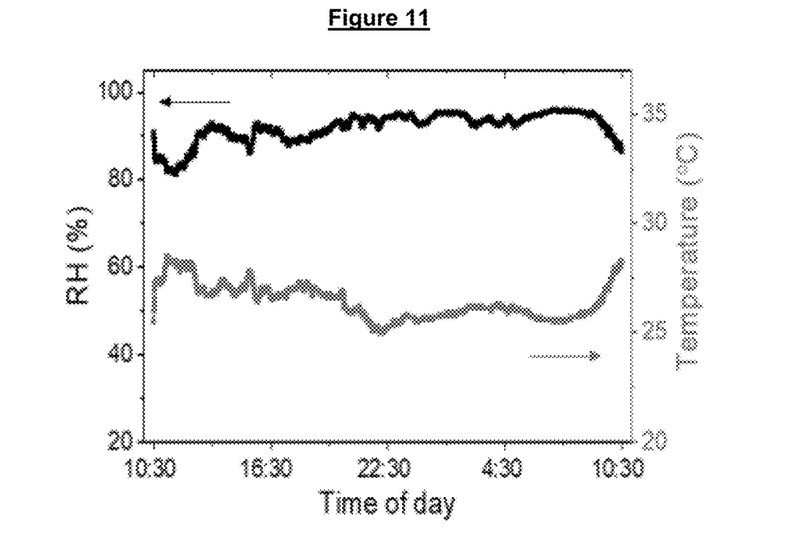
FIG. 11 shows the ambient temperature and humidity as functions of time during water harvesting.

An outdoor test was carried out by deploying a prototype that consisted of an array of PC-MOF aerogels. The prototype was placed outdoors for 24 hours to achieve simultaneous uptake-release (FIG. 11). Thermal activation was subsequently applied to further collect detained water. The prototype is capable of harvesting 4.20 g of water per g of PC-MOF and can attain a significant water delivery along with thermal activation in 15 minutes, which is 92% of the total uptake.

Photothermal Engineering and Structural Design

Figure 12:
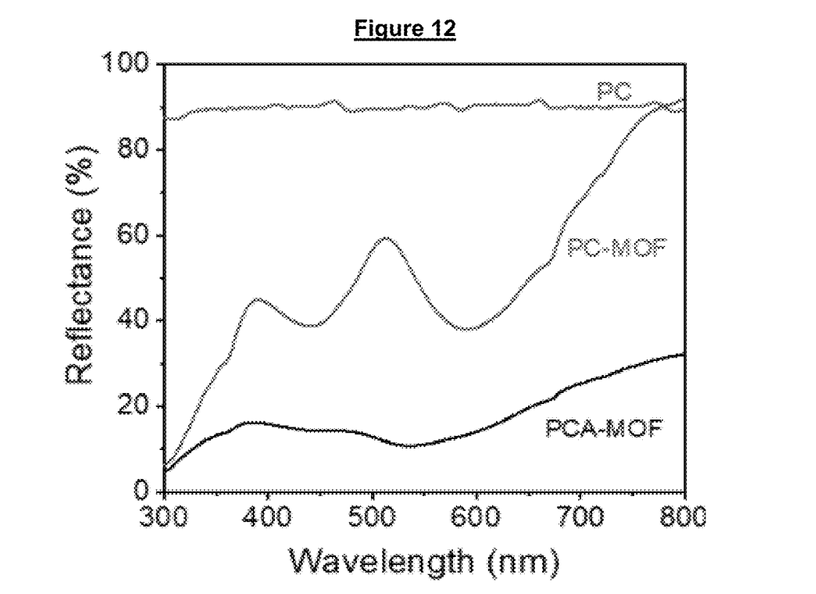
FIG. 12 shows reflectance spectra of the PC, PC-MOF and PCA-MOF.
Figure 13:
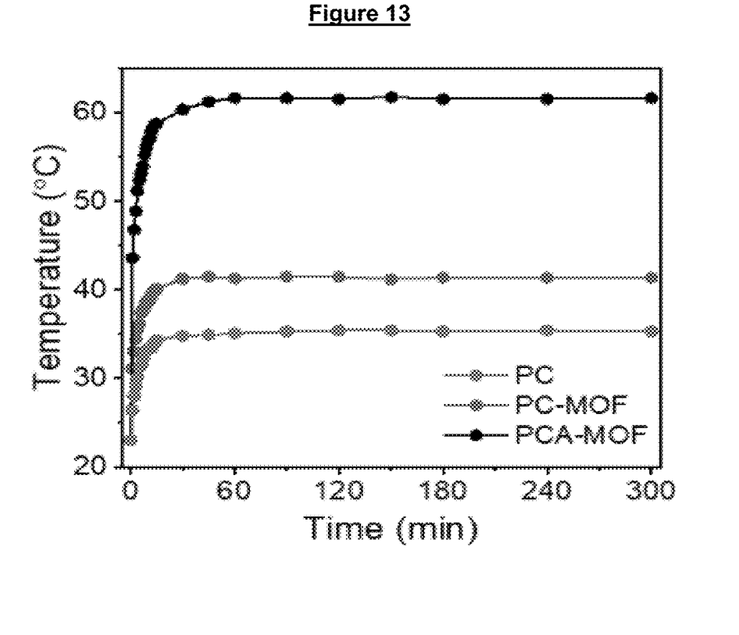
FIG. 13 shows temperature changes of the PC, PC-MOF and PCA-MOF over time under 1 sun solar irradiation.

MIL-101(Cr) was loaded with Au nanoparticles and incorporated into the polymer (PCA-MOF) to realize the photothermal effect. PCA-MOF with a cone array geometry was also fabricated to realize directional migration of water droplets for accelerated removal and refreshing the sorbent's surface by gravity effect. This in turn enabled the rapid movement and coalescence of the seeped droplets and eased the release of accumulated ones at the cone tip. As seen in FIG. 12, the PCA-MOF suppressed light reflectance compared to the PC and PC-MOF. As seen in FIG. 13, the temperature of the PCA-MOF can rise up to 53° C. from room temperature in 5 minutes under solar irradiation, indicating excellent light-to-heat conversion capability.

Figure 14:
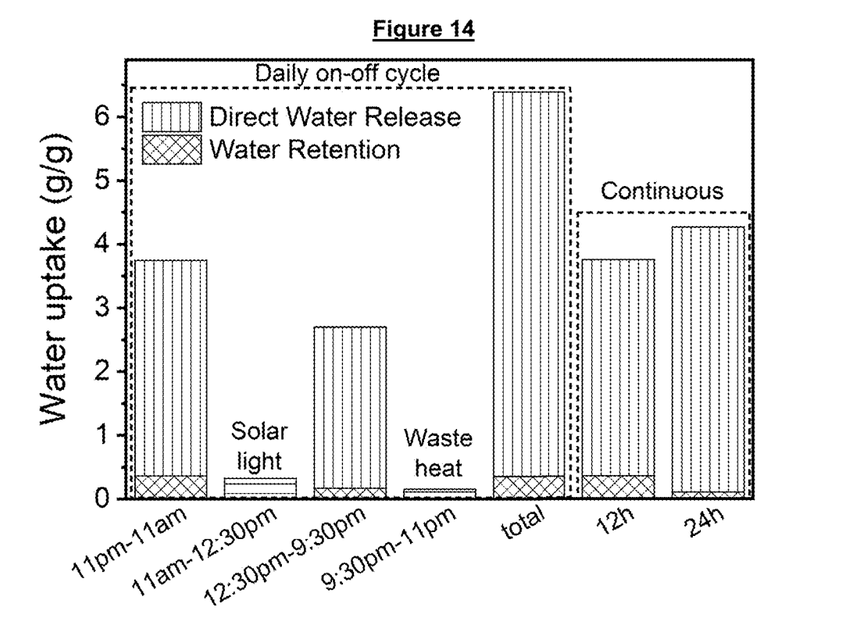
FIG. 14 shows daily water uptake performance of the PCA-MOF cone array via solar-assisted regeneration-based (on-off) and continuous processes.

An all-day water harvesting process was carried out. As seen from FIG. 14, from 11:00 pm to 11:00 am (90% RH and 25° C.), a water uptake of 3.74 g g$^{-1}$ was attained with a remarkable direct water release that constituted 90% of the total uptake. The total water uptake and directly released water amount obtained from the PCA-MOF cone array were 24% and 46% higher than that obtained from the regular circular design, respectively. From 12:30 pm to 9:30 pm (90% RH and 25° C.), the desorbed PCA-MOF yielded 2.52 g g$^{-1}$ by direct release at 90% RH.

Figure 15:
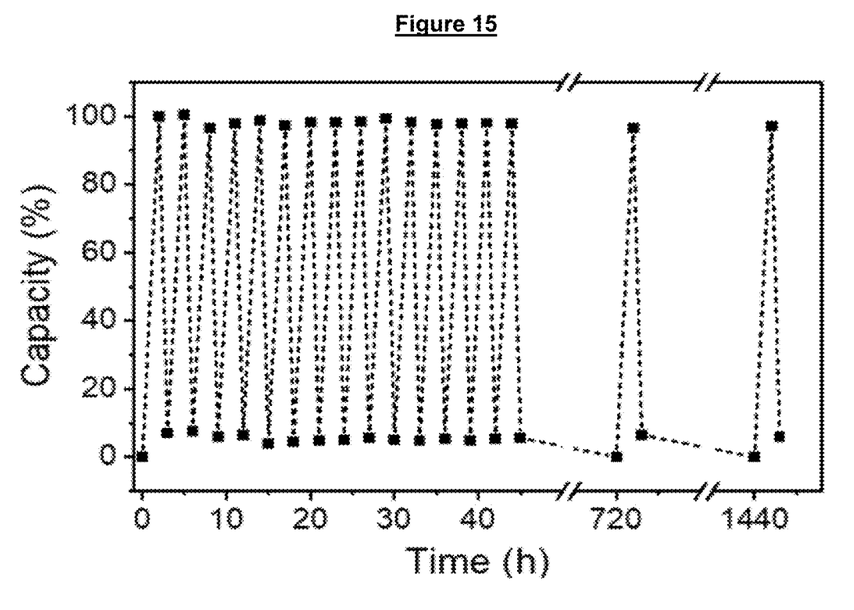
FIG. 15 shows water sorption-release cycles for PCA-MOF.

Altogether, in a daily cycle, the PCA-MOF cone array exhibited a water sorption capacity of 6.39 g g$^{-1}$ and of which a total of 6.04 g g$^{-1}$ was collected as liquid water, while 0.35 g g$^{-1}$ detained water was desorbed. Apart from the daily solar-assisted process, continuous water collection can also be carried out in areas where solar radiation is scarce (FIG. 15). It achieved a total liquid delivery efficiency of 95% and an autonomous liquid delivery efficiency of 71%.

$$\text{Total liquid delivery efficiency }(TLDE) = \frac{\text{amount of liquid delivered}}{\text{amount of sorption}}$$

$$\text{Autonomous liquid delivery efficiency }(ALDE) = \frac{\text{amount of liquid delivered autonomously (no solar input)}}{\text{amount of liquid } delievered \text{ (optional solar input)}}$$

The sorbent reusability was tested by performing consecutive atmospheric water capturing-releasing cycles for 45 hours (FIG. 16). Continuous cycling performance did not present any significant capacity loss as the gel performed well even after a prolonged time (1440 hours), indicating its potential in long-term operational stability.

Whilst the foregoing description has described exemplary embodiments, it will be understood by those skilled in the technology concerned that many variations may be made without departing from the present invention.

The invention claimed is:

1. A polymer-metal organic framework mixed-matrix aerogel comprising a polymer cross-linked with a metal organic framework, wherein the aerogel is capable of continuous sorption-desorption of atmospheric water, and wherein the polymer cross-linked with the metal organic framework is in a coil state.

2. The aerogel according to claim 1, wherein the polymer comprises: polyacrylamide (PAM), polypyrrole (PPy), polyvinyl alcohol (PVA), polyacrylic acid (PAA), polyether, polyoxazole, poly(N-vinylcaprolactam) (PVCL), polysilicone, agarose, cellulose, chitosan, co-polymers or mixtures thereof.

3. The aerogel according to claim 1, wherein the polymer comprises: poly(N-isopropylacrylamide) (PNIPAM).

4. The aerogel according to claim 1, wherein the metal organic framework comprises chromium, zirconium, iron, aluminium, titanium, hafnium, gallium, yttrium, vanadium, zinc, cobalt, copper, magnesium, nickel, alloys or mixtures thereof.

5. The aerogel according to any claim 4, wherein the metal organic framework comprises MIL-101(Cr).

6. The aerogel according to claim 1, wherein the metal organic framework is doped with a photothermal material, a plasmonic material or a mixture thereof.

7. The aerogel according to claim 1, wherein the polymer cross-linked with a metal organic framework further comprises a hygroscopic salt.

8. The aerogel according to claim 7, wherein the hygroscopic salt comprises chlorides, bromides, nitrates, or a mixture thereof.

9. The aerogel according to claim 1, wherein the aerogel enables continuous sorption-desorption of atmospheric water without use of external energy sources.

10. The aerogel according to claim 1, wherein the aerogel comprises ≤40 wt % metal organic framework based on the total weight of the aerogel.

11. The aerogel according to claim 1, wherein the aerogel is a self-standing aerogel.

12. The aerogel according to claim 1, wherein the aerogel enables collection of ≤6.4 g/g water per day at 90% relative humidity.

13. A method of forming an aerogel according to claim 1, the method comprising:
- polymerising a polymer and a metal organic framework in the presence of a crosslinker and initiator to obtain a polymer-metal organic framework hydrogel;
- transforming polymer chains comprised in the polymer-metal organic framework hydrogel from globule state to coil state; and
- freeze-drying the hydrogel to form the aerogel.

14. The method according to claim 13, wherein the polymerising is carried out for ≥0.5 hours.

15. The method according to claim 13, wherein the polymerising is carried out at a temperature of 4-60° C.

16. The method according to claim 13, wherein the transforming comprises introducing hydro-active sorption sites in the hydrogel.

17. The method according to claim 16, wherein the introducing comprises ionically grafting the hydro-active sorption sites.

18. The method according to claim 16, wherein the introducing comprises adding a hygroscopic salt solution to the hydrogel.

19. A polymer-metal organic framework mixed-matrix aerogel comprising a polymer cross-linked with a metal organic framework doped with a photothermal material, a plasmonic material or a mixture thereof, wherein the aerogel is capable of continuous sorption-desorption of atmospheric water.

* * * * *